US012635664B2

(12) United States Patent
Cody

(10) Patent No.: US 12,635,664 B2
(45) Date of Patent: May 26, 2026

(54) PORTABLE FEED AND GRAIN DISTRIBUTOR

(71) Applicant: Steve Cody, Caolgate, OK (US)

(72) Inventor: Steve Cody, Caolgate, OK (US)

( * ) Notice: Subject to any disclaimer, the term of this patent is extended or adjusted under 35 U.S.C. 154(b) by 0 days.

(21) Appl. No.: 18/445,725

(22) Filed: Jan. 2, 2024

(65) Prior Publication Data

US 2025/0212840 A1     Jul. 3, 2025

(51) Int. Cl.
*A01K 1/01*          (2006.01)
*A01K 5/01*          (2006.01)

(52) U.S. Cl.
CPC .................................. *A01K 5/0107* (2013.01)

(58) Field of Classification Search
CPC ...... A01K 5/0107; A01K 5/01; A01K 5/0105; E02F 3/4075
See application file for complete search history.

(56) References Cited

U.S. PATENT DOCUMENTS 3,883,003 A     5/1975   Stevens
4,798,510 A  *  1/1989   Lazenby  ............... E04G 21/025
                                                    414/326

5,829,949 A  *  11/1998  Brown  .................. E02F 3/4075
                                                    141/10
6,263,833 B1    7/2001   Runyon
8,418,651 B1 *  4/2013   Kight  ....................... A01K 5/01
                                                    119/52.1
9,420,759 B2    8/2016   Aton
9,700,013 B2    7/2017   Lahman
11,284,601 B2 * 3/2022   Kleinsasser  ............. A01K 5/01
2006/0073004 A1* 4/2006  Drexelius  ............. E02F 3/4075
                                                    414/719
2006/0277783 A1  12/2006  Garton
2007/0181069 A1* 8/2007  Jack  ........................ A01K 5/01
                                                    119/61.1
2011/0011893 A1  1/2011   Cerny

* cited by examiner

*Primary Examiner* — Peter M Poon
*Assistant Examiner* — Danielle A Clerkley
(74) *Attorney, Agent, or Firm* — Randal Homburg

(57)     ABSTRACT

A feed and grain distributor attached to a front end of a tractor or skid steer to haul bulk dry particulate materials, including grain or feed, to deliver bulk quantities contained within the feed and grain distributor to one or more remote locations, the distributor filled from a larger bulk supply and delivered to one or more smaller quantity container at the remote locations using a remote controlled chute assembly installed within the feed and grain distributor and controlled by the tractor or skid steer operator.

10 Claims, 8 Drawing Sheets

PORTABLE FEED AND GRAIN DISTRIBUTOR

CROSS REFERENCE TO RELATED APPLICATIONS

None.

I. BACKGROUND OF THE INVENTION

1. Field of Invention

A feed and grain distributor attached to a light duty tractor or front lift farm or construction implement to haul bulk grain or feed to a feeder, trough or drill implement to deliver the contents of the distributor to one or more remote locations, the distributor filled from a larger feed or grain elevator silo or storage container.

2. Description of Prior Art

A preliminary review of prior art patents was conducted by the applicant which reveal prior art patents in a similar field or having similar use. However, the prior art inventions do not disclose the same or similar elements as the present feed and grain distributor, nor do they present the material components in a manner contemplated or anticipated in the prior art.

In U.S. Pat. No. 9,700,013 to Lehman, a feed bin with a lateral discharge unit is disclosed which has an upper sliding hatch where a fill material is delivered to an upper bin, with the discharge of the bin's contents laterally with the assistance of an auger. The auger is operated by local power and the feed bin has the capacity to be elevated and carried through either forks or hay spikes attached to a tractor or other mobile transport equipment. A similar feed hopper is disclosed in U.S. Pat. No. 9,420,759 to Aton, also having a lateral discharge and auger. See also, U.S. Pat. No. 6,263, 833 to Runyon, set in the bed of a truck with lateral delivery.

Transportable storage containers attached to an overhead lift system are moved about a floor on a stackable roller base or dolly in U.S. Pat. No. 3,883,005 to Stevens. The stack includes the roller base or dolly, a lower container with a tapered bottom and lower dispensing port and a upper bin extension. In U.S. Patent Publication NO. 2011/0011893 to Cerny and 2006/0277783 to Garton, portable storage bins are disclosed which provide an upper particulate storage bin, tapered bottoms within the storage bin and lower discharge openings with either a slide gate or valve to dispense the contents from the respective bins. A base member is detachable from the Garton bin and the Garton bin is raised and lowered from an above lift system. A bucket apparatus is attached to a skid steer loader which allows for the transport flowable materials at a job site, the bucket apparatus having a bottom exit opening and gate adapted for discharge of the contents from the bucket in U.S. Patent Publication NO. 2006/0073004 to Drexelius.

While all the patents identified above have storage bins, discharge chutes and transport means attached to a tractor, a truck bed or skid steer, they do not, individually or combined, identify the features of the present portable grain and feed distributor.

II. SUMMARY OF THE INVENTION

Particulate products are delivered in several manners, depending primarily on quantity and convenience. In agriculture, feed is delivered by the bag or in bulk quantities, ranging from a "scoop", a "dump bucket load", a "truck load" or a "silo full", non-technical terms used by farmers who deal with prepared feed and grains. For particulate minerals, including sand and gravel, similar terms are dependent on the project, which may range from filling a small hole to leveling a landscape. In transportation, weather deicing requires delivery of sand and salt to a roadway primarily by use of truck spreaders.

The purpose of the present distributor is intended to address the issue of delivery and dispensing particulate materials in quantities of hundreds of bushels or pounds of a particulate material into the bin of the present distributor for dispensing quantities of the content to one or more remote locations by a front end loader or skid steer, by eliminating a quantity of the content to a location, remote delivery device, a pickup, a feeder, a feeding trough, a hole, a farming implement including a seed drill, a "no till" planter, within an agricultural retail or manufacturing company, a sand and gravel plant, a milling plant, or a grain elevator. The uses are as numerous as the potential customer desires, provided the purpose of the device is maintained to the limits of the product capacity-which is to load quantities of particulates into an upper bin and delivery the products to a location to be dispensed through a lower remote activated chute by the driver of the transport vehicle who is not required to physically exit the transport vehicle during the delivery and dispensing process.

III. DRAWINGS

The following formal drawings are submitted with this application.

IV. DESCRIPTION OF THE PREFERRED EMBODIMENT

Figure 1:
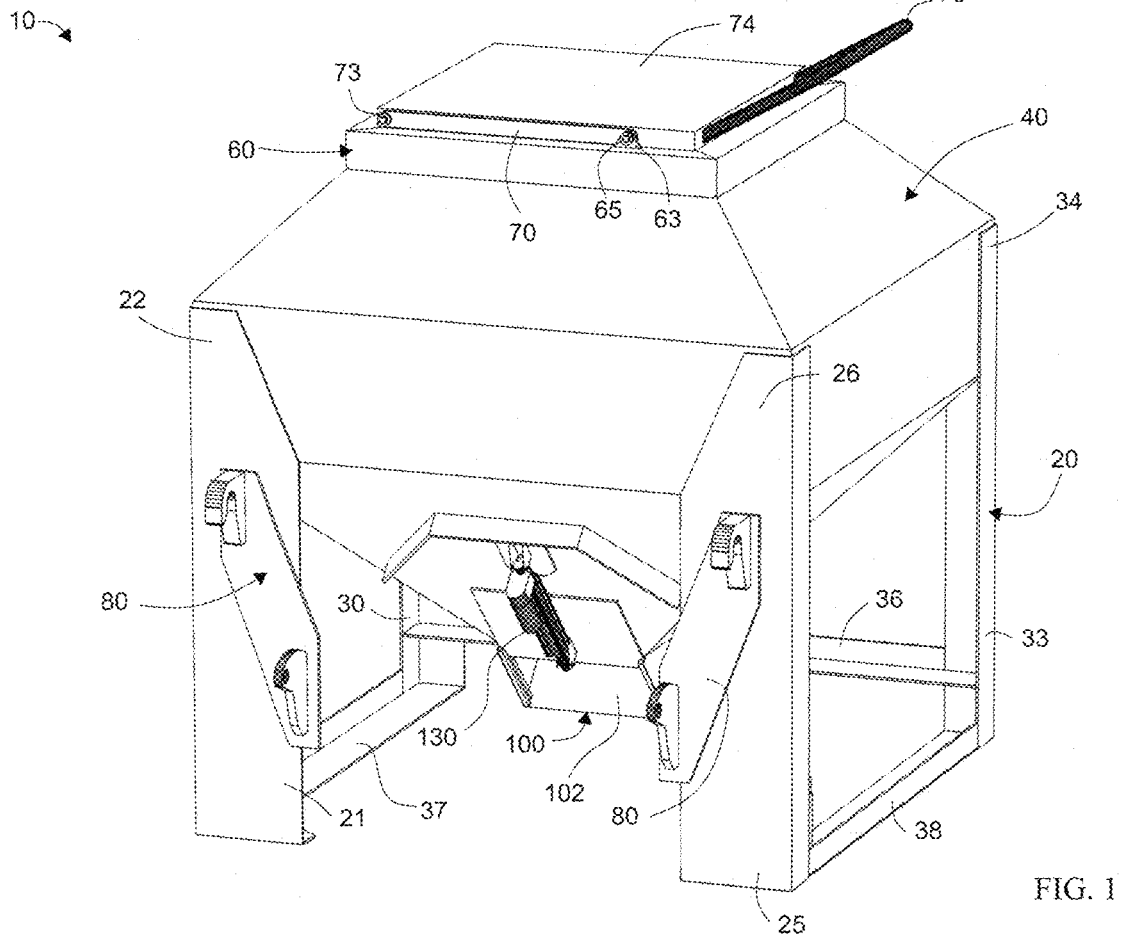
FIG. 1 is a front perspective view of the grain and feed distributor with the upper lid panel in a closed position and the chute door panel in an open position, during distribution.

Several tasks have need for a particulate material transport container that allows for hauling the particulate from a bulk storage container to multiple remote distribution containers. In agriculture, farmers and ranchers find need to transport feed grains from a bulk storage silo to remote stationary feeder devices (troughs), or feed distribution devices (spreaders) or seed planters (plow feeders, drills and no-plow drills). In construction, transport of sand and gravel deliver dry products from a bulk source to various construction sub-sites from the ground up. The same is true in manufacturing.

Alternatively, all of these use transportation in bagged quantities, which is quite labor intensive and require the bagged materials to be handled more than once, even when delivered by palates from truck to storage to area of need or distribution where the product is removed from a bag one-by-one. The present feed and grain distributor is intended for use as a bulk distribution device to transport dry particulate material from a bulk storage container to a location where the dry particulate material is used, consumed or used in an intended manner for an intended use.

The name, feed and grain distributor, is not a limitation of use, since it is intended for use for flowable dry particulate materials in general. The feed and grain distributor can be altered for more vigorous and aggressive material uses by increasing the structural elements thickness, strength, durability and dimension directly proportional to the flowable dry particulate materials, for example, the structural component requirements for hauling feed and grain would be less than those used for hauling sand and gravel due to the weight or mass of the particulates. Thus, structural limitations of the elements disclosed herein may vary and are not included in the claimed subject matter except for the realization that they may be significantly varied.

The feed and grain distributor 10, as shown in FIGS. 1-8, comprise a base assembly 20 to elevate a bin assembly 40 above the ground by a loader attachment assembly 80 attachable to a front lift attachment B of a tractor A or skid steer. The bin assembly 40 further defines an upper lid assembly 60, and a lower chute assembly 100 with a remote activated chute door panel 115 opened and closed by a piston 130 by the operator of the tractor or skid steer using a wireless remote controller 150.

Figure 7:
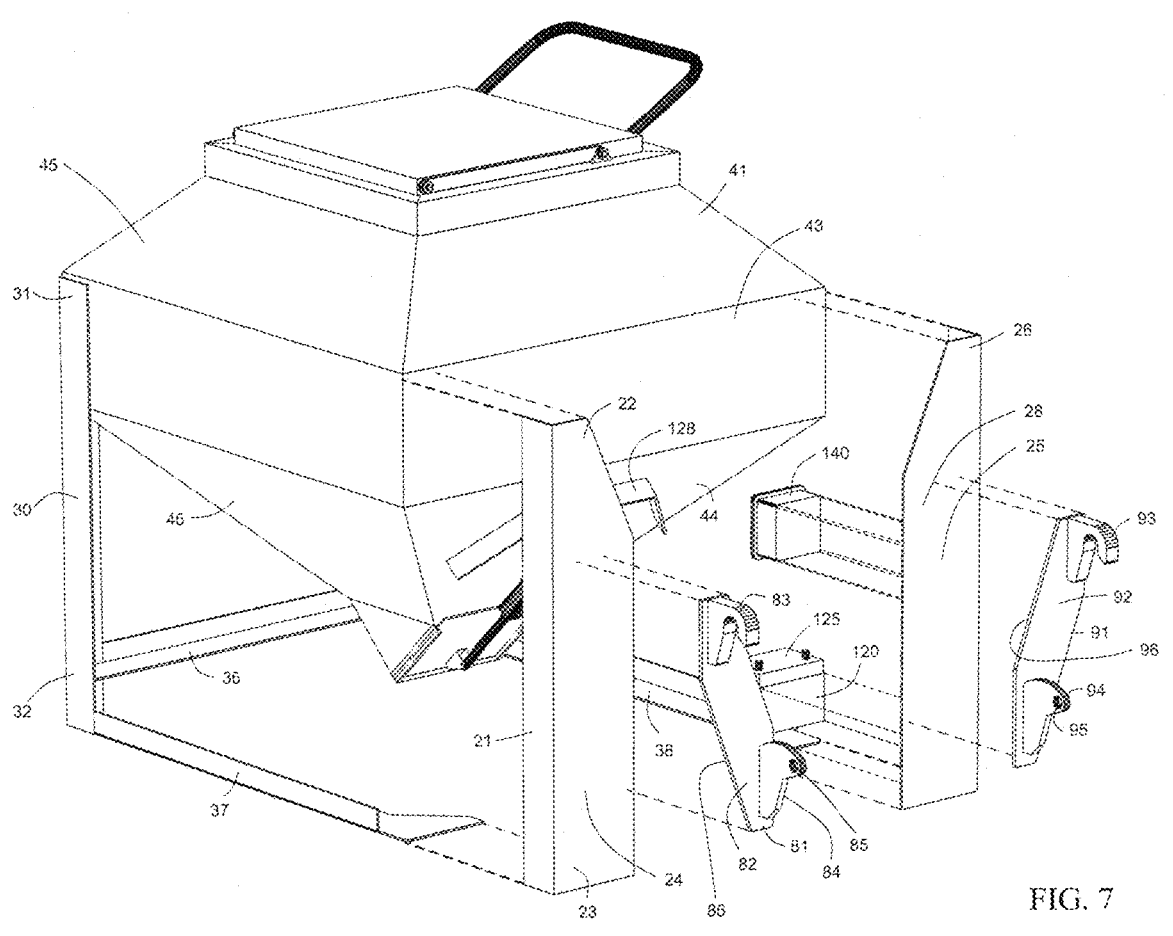
FIG. 7 is a left perspective view of the feed and grain distributor with an exploded view of the front right and left support members, loader plate assembly, remote relay and battery detached.
Figure 8:
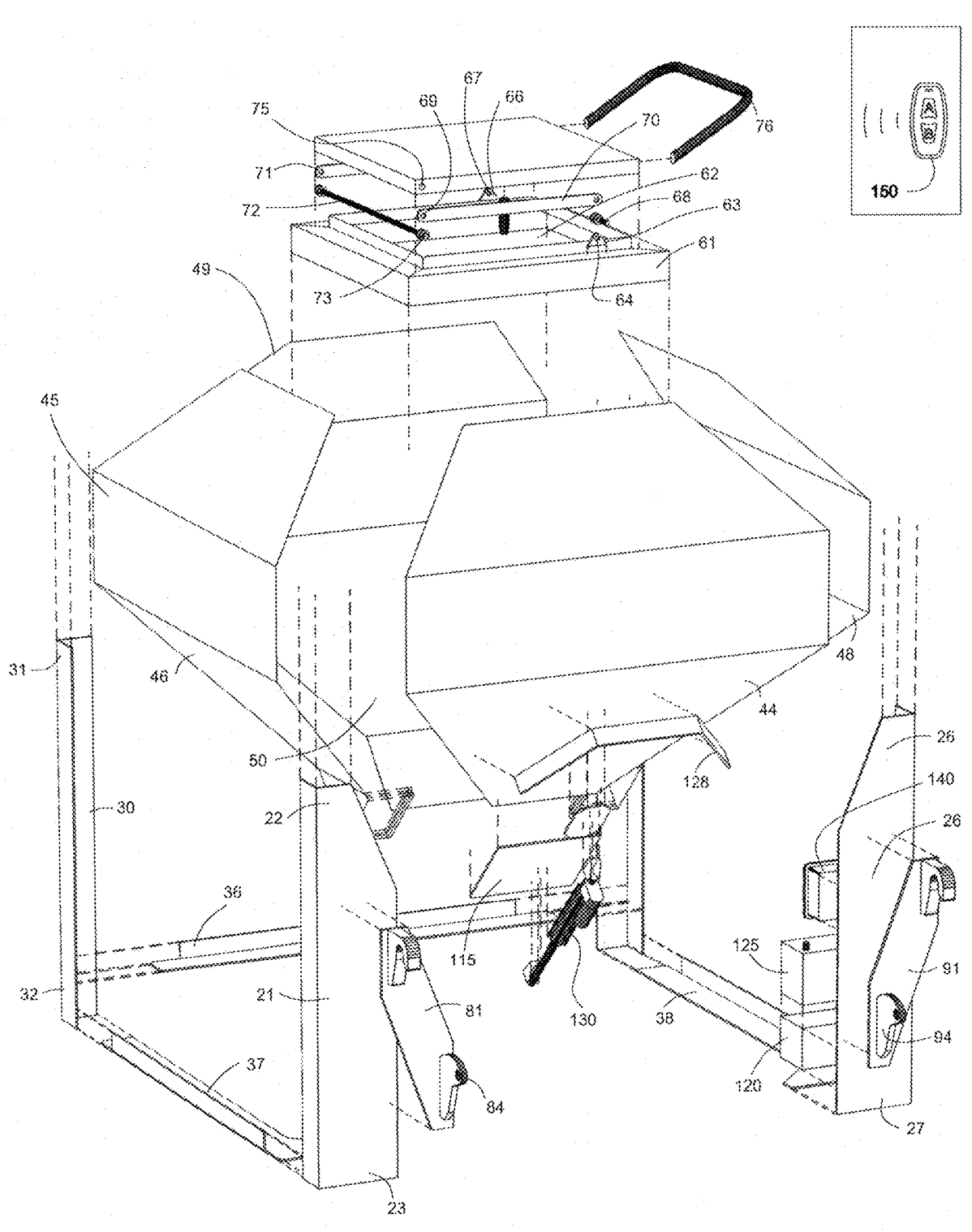
FIG. 8 is a front perspective view of the feed a grain distributor in a fully exploded view is the disassembled structural and operational components.

The base assembly 20 further defines at least three vertical supports, but as shown in FIGS. 1-8, illustrating four. It can be as many as deemed necessary by the manufacturer, but at least three is customarily the minimum selected for horizontal and vertical stability in elevated support of weight bearing platforms. For purposes of the disclosed embodiment there is shown a front left support 21 with a front surface 24, an upper end 22 and lower end 23, a front right support 25 with a front surface 28, an upper end 26 and lower end 27, a rear left support 30 with an upper end 31 and lower end 32 and a rear right support 33 with an upper end 34 and lower end 35. Each front and rear, right and left support, 21, 25, 30, 33 has an equal length and are attached in vertical alignment using a rear cross member 36 connecting the rear left support 30 and rear right support 33 at respective lower ends, 32, 35. A left cross member 37 attaches the respective lower ends 23, 32 of the front left support 21 and rear left support 30, while a right cross member 38 connect the respective lower ends 27, 35 of the front right support 25 and rear right support 33. FIG. 7, and 8 best illustrate this base assembly 20 embodiment.

Figure 2:
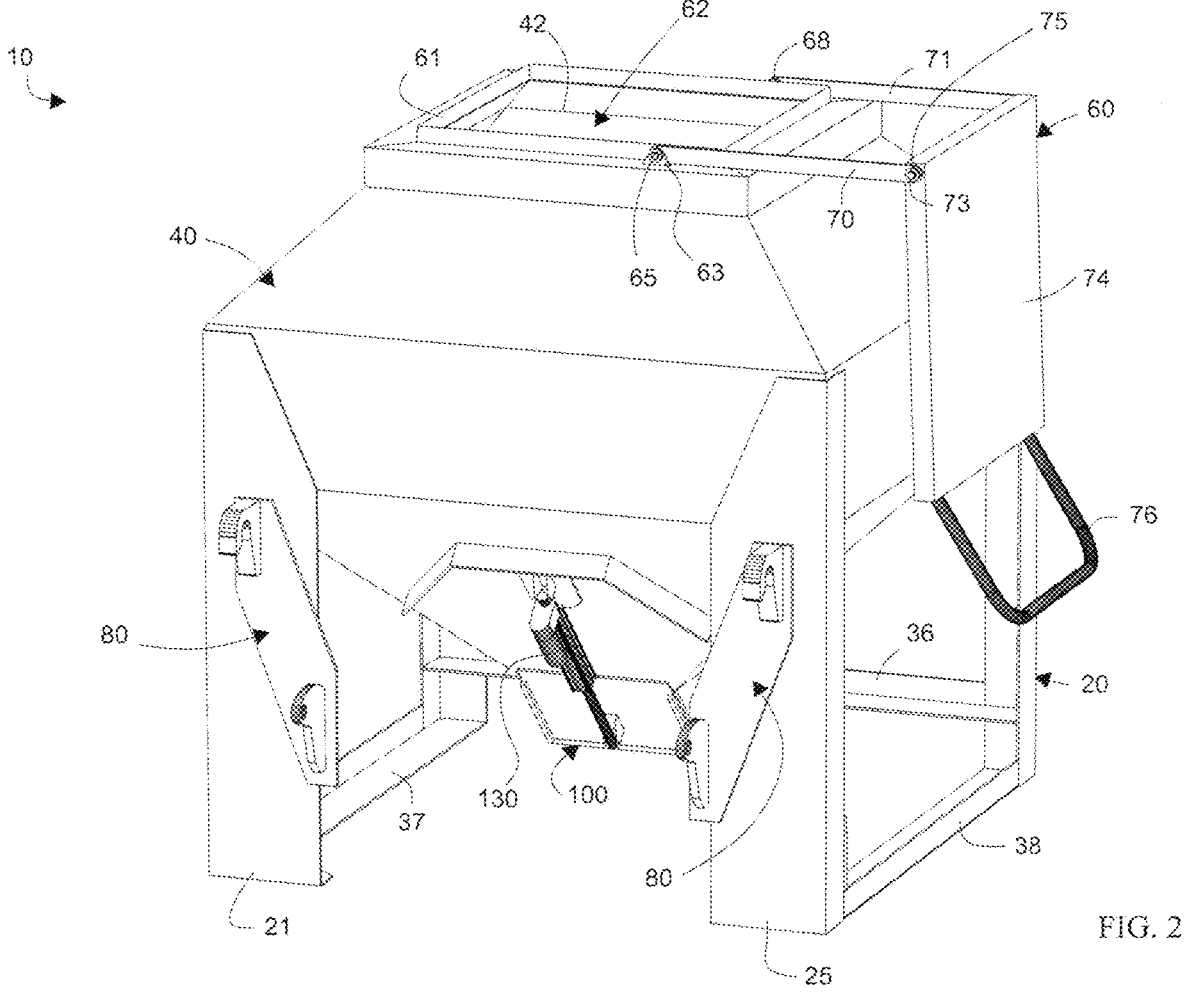
FIG. 2 is the same perspective view of the grain and feed distributor with the upper lid panel in an open position and the chute door panel in a closed position as the grain and feed distributor would be during loading.
Figure 3:
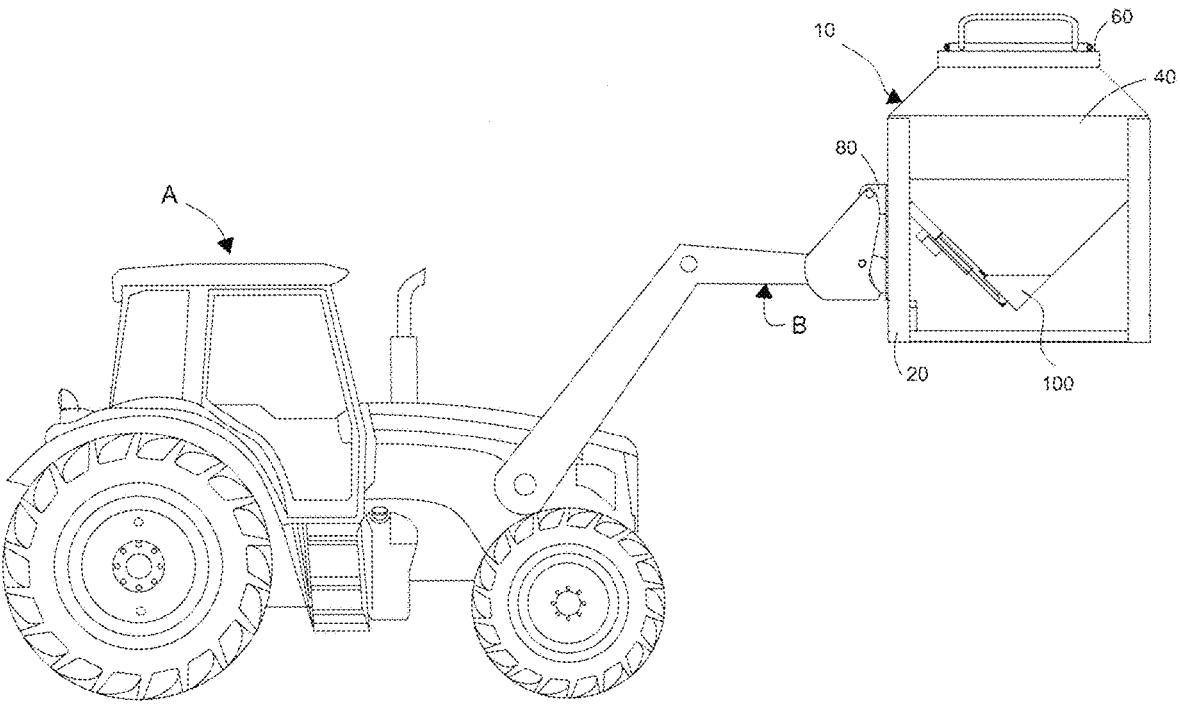
FIG. 3 is a side view of the feed and grain distributor is a raised position while attached to a front lift attachment of a tractor to the loader plate assembly.

The loader plate assembly 80 is attached to the front surfaces 24, 28 of the front left support 21 and the front right support 25 respectively, as shown in FIGS. 1-3 and 6-8. There is a left side plate 81 defining a front surface 82 with an upper hook extension 83, a lower pin extension 84 defining a lateral pin bore 85, and a rear surface 86. A right side plate 91 also defines a front surface 92 with an upper hook extension 93, a lower pin extension 94 having a lateral pin bore 95, and a rear surface 96. This loader plate assembly is welded to the front surface 24, 28 of each respective front left support 21 and front right support 25, as shown in FIGS. 1-2 and 6-8. This provides a means of attaching the feed and grain distributor 10 to the front lift attachment B of the tractor A or skid loader, as shown in FIG. 3 and is secured by an agricultural lynch pin, not shown.

The bin assembly 40 is shown in FIGS. 1-8 as a square container, indicates four connecting panels for purpose defining a container for illustration purposes only, without creating a limitation on the number of panels, shape or design. The illustrated embodiment is not intended to restrict or limit the size, shape or capacity of the bin assembly 40 as to containment weight or volume. Therefore, is should be known that the bin assembly may be provided as square, triangular, polygonal, round oval or any other shape, in any volume and in any capacity. The base assembly 20 would be conformed and adapted to support the bin assembly 40 and modified from that disclosed in the specification and drawing figures. With any perceived limitation stated, the disclosed and illustrated bin assembly 40 defines a front section 43 with a tapered lower panel 44, a left section 45 with a tapered lower panel 46, a right section 47 with a tapered lower panel 48 and a rear section 49 with a tapered lower panel 50, welded together to form the disclosed sealed vessel. At an upper end 41 of the bin assembly 40 is a load opening 42 defining a lid cowling 61 with a central opening 62 upon which the lid assembly 60 is mounted. The upper ends, 22, 26, 31 and 34 of each respective four supports, shown FIGS. 1-8 are further welded or otherwise connected to the directional bin assembly sections, 43, 45,47 and 49.

The chute assembly 100 is formed below the junction of the tapered lower ends 44, 43, 48, 50, the chute assembly 100 defining a front opening 102, a right side element 103, a left side element 104 and a rear chute floor 105. A door slot 111, 113, is defined within a left side channel 110, and a right side channel 112 formed with each respective left side element 104 and right side element 103, as shown in FIGS. 1-2, 4-5 and 7-8. The chute door panel 115 is slideably engaged within the laterally aligned door slots 111, 113 of the respective right and left side channels 112, 110 at the chute door panel 115 right edge 117 and left edge 116. The chute door panel 115 is closed for filling the bin assembly 40 and during transport. The chute door panel 115 is opened when the bin assembly 40 contents are being intentionally dispensed.

The lid assembly 60 defines the lid cowling 61 with the central opening 62, as shown in FIG. 1, with an upper lid panel 74 in a closed position and in FIG. 2 with the upper lid panel 74 open and lowered for loading. In the drawing figures, the central opening 62 and the load opening 42 are basically the same opening, where contents are imported to fill the bin assembly 40 through the lid assembly 60. The distinction is that the central opening 62 is defined within the lid cowling 61, while the load opening 42 is defined in the upper end 41 of the bin assembly 40.

The upper lid panel 74 is attached in a manner where it can be raised, pulled forward and then laid open to the right side of the bin assembly 40 where it hangs vertically during loading of contents into the bin assembly 40 to avoid damage to the upper door panel 74 during loading. It is also possible that the upper lid panel 74 may be attached in a reverse manner, to be laid open to the left side of the bin assembly 40. It is not intended to be fully removed from the feed and grain distributor 10. The upper lid panel 74 attachment is provided as shown in 1-2 and 6-8 by the inclusion of a front hinge 63 defining a hinge bore 64 and a rear hinge 66 defining a hinge bore 67, a front pivot bar 70 and a rear pivot bar 71, and a linear axle bore 69 through the lid cowling 61. The upper lid panel 74 correspondingly includes a rear axle bore, which will be connected to each respective front and rear pivot bar 70, 71 by a singular pivot axle secured by respective axle caps 73, pivotally securing the upper lid panel 74 to each respective front and rear pivot bar 70, 71, FIG. 8. The front pivot bar 70 and the rear pivot bar 71 are further independently secured to each respective hinge bore 64, 67 of each respective front hinge 63 and rear hinge 66 by respective hinge pins 65, 68. Extending from the upper lid panel 74 is a door handle 76.

Figure 4:
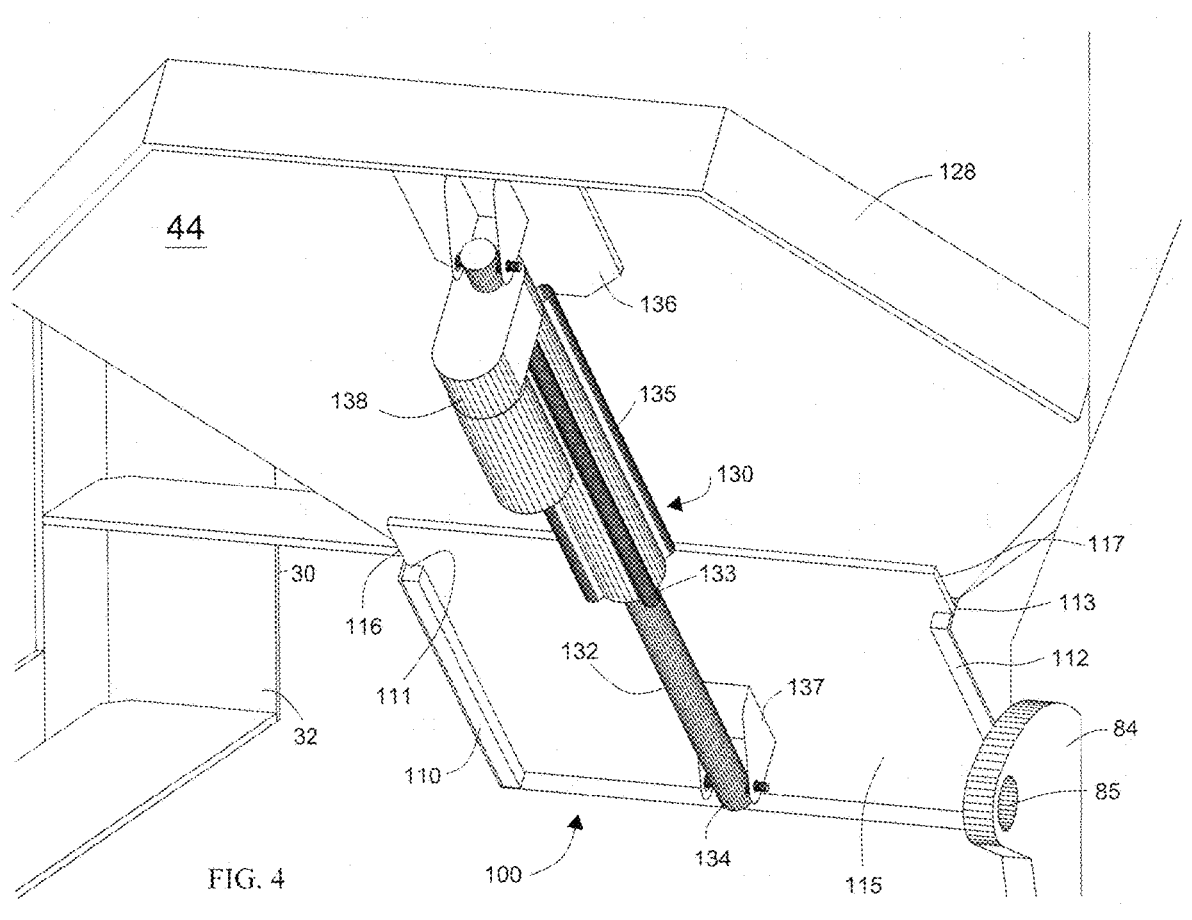
FIG. 4 is an isolation view of the retractable piston with the chute door panel in a closed position.
Figure 5:
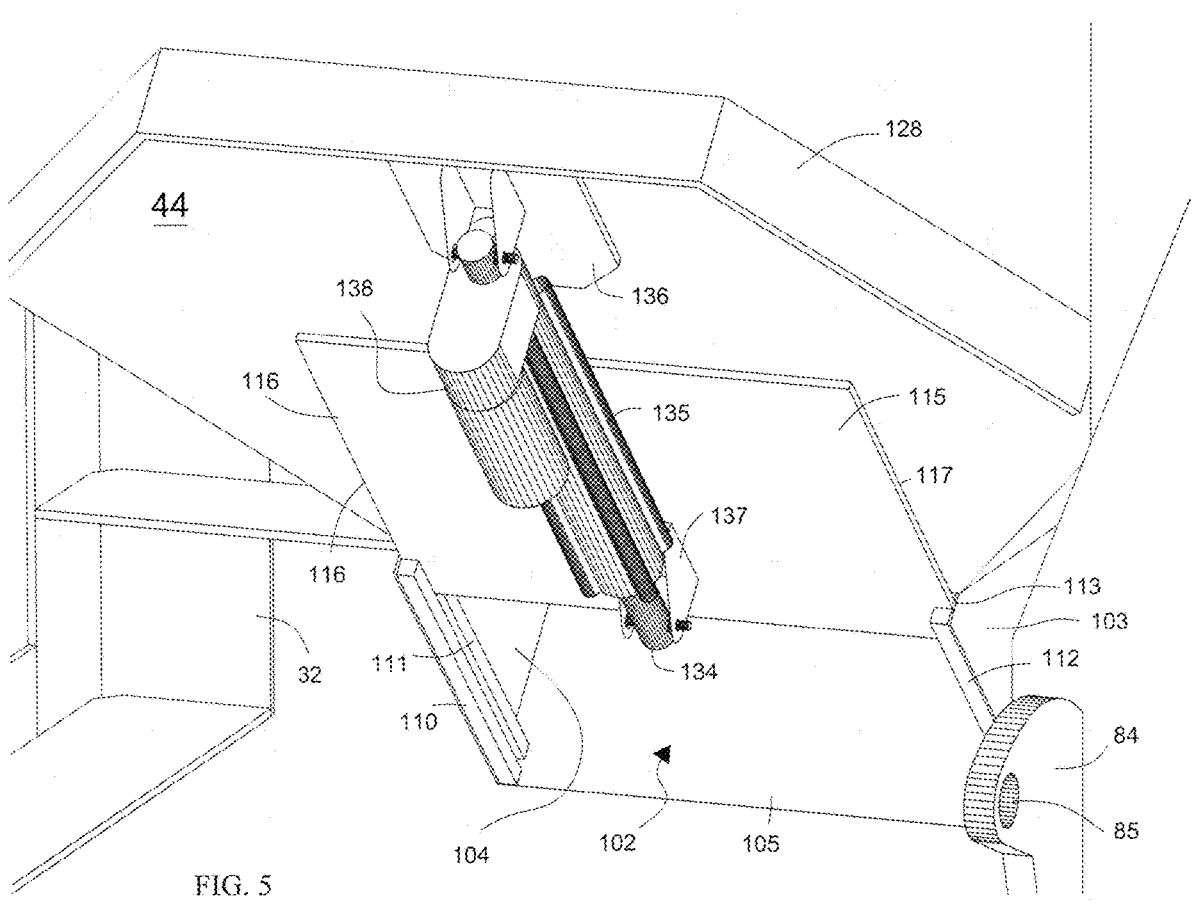
FIG. 5 is an isolated view of the retractable piston with the chute door panel in an open position.
Figure 6:
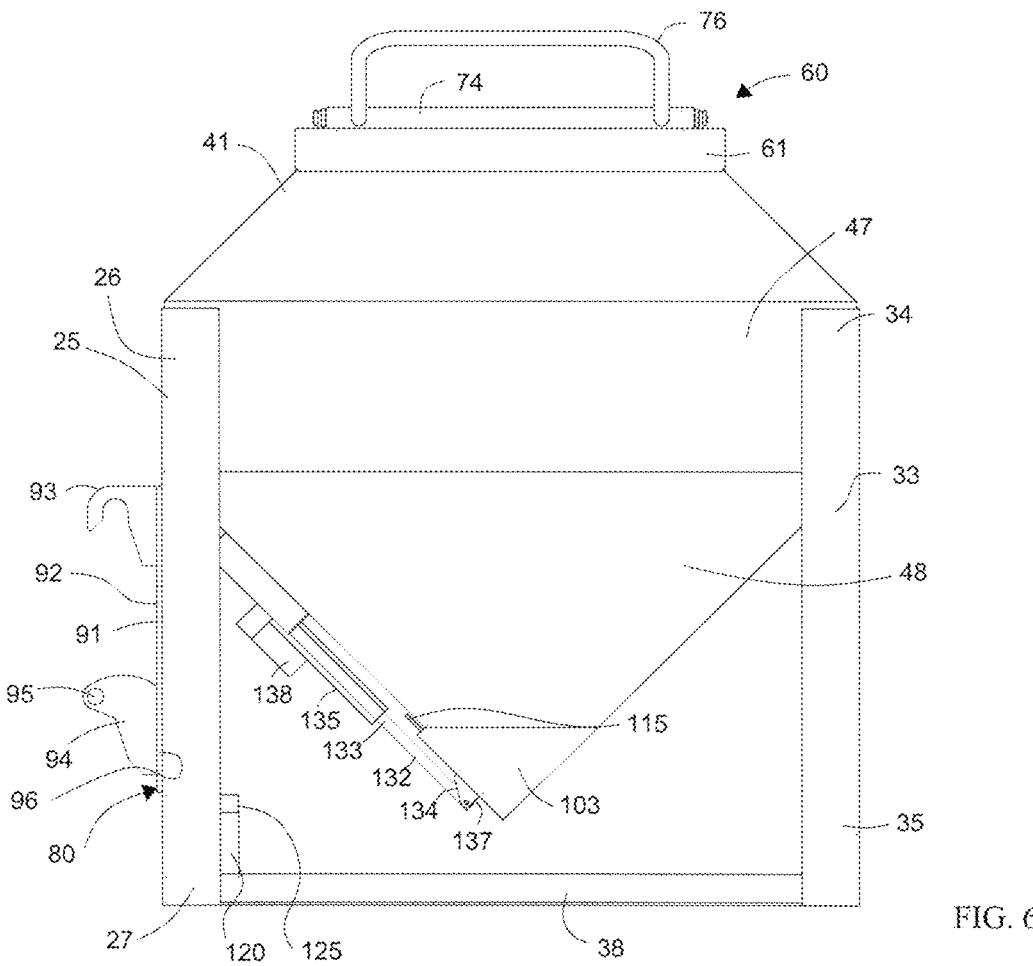
FIG. 6 is a side view of the feed and grain distributor with the chute door panel in a closed position.

The lid assembly 60, the piston 130 and the chute assembly 100 are the only moving parts of the structural components of the feed and grain dispenser 10. To move the chute door panel 115 between an open and closed position, FIGS. 1 and 2, the remote activated piston 130 is installed, the remote activated piston 130 defining a piston shaft 132 having an upper 133 and lower end 134, and a piston housing 135 including an inner piston actuator 138, with an upper housing mount 136 attaching the piston housing 135 to the front tapered lower panel 44 above the front opening 102 of the chute assembly 100 and a lower piston mount 137 attaching the lower end 134 of the piston shaft 132 to the chute door panel 115, FIGS. 1-2 and 4-5. When the piston shaft 132 is retracted, FIGS. 1 and 5, the chute door panel 115 is moved upward to open the front opening 102 in the chute assembly 100 and allow for gravity flow of the particulates contained with the bin assembly 40. Under control, the chute door panel 115 is lowered to close the chute assembly 100 by the extension of the piston shaft 132, FIGS. 2 and 4. The movement of the piston shaft 132 occurs when a remote controller 150 wirelessly signals a remote relay 140 installed within the base assembly 20 which further signals the piston actuator 138 to extend or retract the piston shaft 132 within the piston housing 135, shown in FIGS. 1-2 and 4-5 in contrast, with FIGS. 1 and 5 indicating the open position, chute door panel 115 raised and piston shaft 132 retracted, and FIGS. 2 and 4 showing the closed position, chute door panel 115 lowered and piston shaft 132 extended. The remote controller 150 is activated by the operator of the tractor A or skid steer, who has a clear vision of the chute assembly 100 from his operator position, FIG. 3, not showing the operator but the linear vision orientation between the operator and the attached feed and grain distributor 10. A piston guard 128 may be attached to avoid incidental contact with the piston. Additionally, a local battery 125 is supplied and installed within a battery box 120 mounted to the base assembly 20, FIG. 8, to provide a power supply to the remote relay 140, and piston actuator 138.

The feed and grain dispenser 10 is easily operated. Disclosure of steps for use begin with attaching the feed and grain dispenser 10 to the tractor A or skid steer as shown in FIG. 3 using lynch pins, not shown in detail, to secure it to the tractor A or skid steer, to the feed and grain distributor 10. It is filled by using a mechanical means or gravity flow device to load the bin assembly 40 with the desired particulate through the central opening 62 when the lid assembly 60 is open, FIG. 2, up to capacity with the chute assembly 100 having the chute door panel 115 lowered to seal off the front opening 102. The attached and filled seed and grain dispenser 10 is then transported to one or more location to dispense the contents where desired in intentional quantities by opening the chute door panel 115, FIGS. 1, 5, by the operator's use of the remote controller 150 which provides remote opening and closing of the chute door panel 115 by retracting and extending the piston shaft 132 through the piston actuator 138 via the remote relay 140. The operator is in complete control of the measured dispensing of the particulate contents.

As previously stated, the feed and grains dispenser 10 can be used and structurally adapted for use for any dry particulate content, although it is within the scope of the content . . . possibilities that it could also adapted for used to dispense wet content. A volume of gravel would be obviously more heavy that the same volume of corn. Structurally, the feed and grain distributor 10 for corn would not need to be structurally equal to that used for the gravel-containing manufactured product. Therefore, if the feed and grain dispenser 10 is produced with various content-weighted structural capacities, it should meet the structural support requirements of those varied capacities. It would also be relevant in selectin the material grades of the various product structural elements, including thickness of sheet metals, metal versus composition, weldments, angled metal base assembly 20 components, loader plate assembly 80 components and chute assembly components 100.

It is contemplated that various bulk loading devices can be used to fill the feed and grain dispenser 10. The best loading potential would come from an elevated silo that dispenses the dry particulate, including grain, feed, or other flowable dry particulate. Conveyor and uplift augers can also be used and even extended chutes directly attached to harvest equipment. It is also contemplated that a good old fashioned shovel can be used for those unfortunate to have no other choice.

Remote delivery sites may include deer and wildlife feeders, troughs, plant feed mixers, and stock pens used for feeding wildlife and domestic livestock. Many farmers and ranchers have one or more feed locations that require periodic and daily servicing, especially where beef production is the chief purpose of the livestock. Therefore the livestock production aspects involve servicing one or more remote cattle, livestock, and domestic animal feeders. For construction purposes sand, gravel and construction products may be transported to smaller quantity required locations using this bulk feed and grain dispenser 10 modified for the capacity requirements of delivery and operation. It is also likely that the feed and grain dispenser 10 can be modified for light uses in manufacturing of plastics, pellets, glass or synthetic beads, powders, resins or chips within a manufacturing plant using the skid steer or front end loader.

While the feed and grain distributor 10 has been particularly shown and described with reference to a preferred embodiment thereof, it will be understood by those skilled in the art that changes in form and detail may be made therein without departing from the spirit and scope of the invention.

What is claimed is:

1. A feed and grain distributor which is filled with a dry bulk particulate material for distribution by attaching said feed and grain distributor to a front lift attachment of a tractor or skid steer, said dry bulk material delivered to one or more remote locations and dispensed in controlled amounts, said feed and grain distributor comprising:

a base assembly supporting a bin assembly elevated above lower ends of three or more supports attached to said bin assembly at respective upper ends, wherein said bin assembly is attached to said front lift attachment of a trailer or skid steer by a loader attachment assembly attached to said base assembly, said bin assembly further defining an upper lid assembly, and a lower chute assembly having a remote activated chute door panel opened and closed by a piston actuator extending and retracting a piston attached between said bin assembly and said chute door panel from said tractor or skid steer using a wireless remote controller during delivery and dispensing of the dry bulk particulate material;

a lid cowling attached above an upper end of said bin assembly defining a central opening;

a front hinge having a hinge bore, a rear hinge having a hinge bore, said front hinge and said rear hinge attached to said lid cowling and a linear axle bore; a front pivot bar attached to said front hinge by a hinge pin and a rear pivot bar attached to said rear hinge by a hinge pin; and an upper lid panel defining a lateral rear axle bore attached to said front and rear pivot bars by a common pivot axle secured in place by axle caps, wherein said upper lid panel is configured to be lifted by a door handle and displaced from said central opening, said door panel is configured to be elevated and moved to a side of said bin assembly in a direction of said door handle, and said upper lid panel is placed in a vertical suspended position during a loading process of said dry bulk particulates through said load opening of said bin assembly and said central opening of said lid cowling, further wherein said upper lid panel is replaced over said lid cowling prior to said delivery and dispensing using said wireless remote controller.

2. The feed and grain distributor of claim 1, further comprising a battery mounted within a battery box on said base assembly providing electrical power to operate said piston actuator through a remote relay, also mounted upon said base assembly, compelling the opening and closing of said chute door panel visible from said tractor or skid steer.

3. The feed and grain distributor of claim 1, further comprising:

an upper end defining a load opening;

a front section defining a tapered lower panel;

a left section defining a tapered lower panel;

a right section defining a tapered lower panel;

a rear section defining a tapered lower panel, wherein said front section, left section, right section and rear sections and said corresponding tapered lower panels are welded together, said welded tapered lower panels depending from said lower chute assembly.

4. The feed and grain distributor of claim 1, wherein the bin assembly further comprises:

an upper end defining a load opening;

a front section defining a tapered lower panel;

a left section defining a tapered lower panel;

a right section defining a tapered lower panel;

a rear section defining a tapered lower panel, wherein said front section, left section, right section and rear sections and said corresponding tapered lower panels are welded together; and said lower chute assembly further comprising a front opening, a right side element, a left side element and a rear chute floor;

a left side channel defining a door slot installed upon said left side element; and a right side channel defining a door slot installed upon said right side element, wherein said door panel slidably engages said door slots respectively on a left edge and right edge of said door panel within said door slots of said left side channel and said right side channel with movement of said door panel from said open and closed positions, sealing off said chute assembly to contain said dry bulk particulate materials until intentionally released from said bin assembly.

5. The feed and grain distributor of claim 1, further comprising:

said piston further defines a piston housing attached to said tapered lower end of said front section of pin assembly above front opening of said chute assembly by an upper housing mount, said piston housing internally containing an upper end of said piston shaft, piston shaft defining a lower end attached to said chute door panel by a lower piston mount, said piston shaft extending from and retracting by activation of said piston actuator under the control of the remote controller through a remote relay attached to said feed and grain distributor which is empowered by a battery contained within a battery box also mounted upon said feed and grain distributor.

6. The feed and grain distributor of claim 1, wherein the bin assembly further comprises:

an upper end defining a load opening;

a front section defining a tapered lower panel;

a left section defining a tapered lower panel;

a right section defining a tapered lower panel;

a rear section defining a tapered lower panel, wherein said front section, left section, right section and rear sections and said corresponding tapered lower panels and are welded together; and said lower chute assembly further comprising a front opening, a right side element, a left side element and a rear chute floor;

a left side channel defining a door slot installed upon said left side element; and a right side channel defining a door slot installed upon said right side element, wherein said door panel slidably engages said door slots respectively on a left edge and right edge of said door panel within said door slots of said left side channel and said right side channel with movement of said door panel from said open and closed positions, sealing off said chute assembly to contain said dry bulk particulate materials until intentionally released from said bin assembly.

7. The feed and grain distributor of claim 1, further comprising:

said piston further defines a piston housing attached to said tapered lower end of said front section of a pin assembly above a front opening of said chute assembly by an upper housing mount, said piston housing internally containing an upper end of said piston shaft, said piston shaft defining a lower end attached to said chute door panel by a lower piston mount, said piston shaft extending from and retracting by activation of said piston actuator under the control of the remote controller through a remote relay attached to said feed and grain distributor which is empowered by a battery contained within a battery box also mounted upon said feed and grain distributor.

8. A feed and grain distributor which is filled with a dry bulk particulate material for distribution by attaching said feed and grain distributor to a front lift attachment of a tractor or skid steer, said dry bulk material delivered to one or more remote locations and dispensed in controlled amounts, said feed and grain distributor comprising:

a base assembly supporting a bin assembly elevated above lower ends of three or more supports attached to said bin assembly at respective upper ends, wherein said bin assembly is attached to said front lift attachment of a trailer or skid steer by a loader attachment assembly attached to said base assembly, said bin assembly further defining an upper lid assembly, and a lower chute assembly having a remote activated chute door panel opened and closed by a piston actuator extending and retracting a piston attached between said bin assembly and said chute door panel from said tractor or skid steer using a wireless remote controller during delivery and dispensing of the dry bulk particulate material, said base assembly further providing a front left support defining an upper end, a lower end and a front surface, a front right support defining an upper end, a lower end and a front surface, a rear left support defining an upper end and lower end, a rear right support defining an upper end and lower end, a rear cross member attaching said respective lower ends of said rear right and left supports, a right cross member attaching said respective lower ends of said front right and rear right supports, and a left cross member attaching said respective lower ends of said front and rear left supports, retaining said bin assembly above said right and left cross members; and said loader attachment assembly defining a left side plate having a rear surface attached to said front surface of said front left support, said left side plate further defining a front surface extending an upper hook extension and a lower pin extension having a lateral pin bore, and a right side plate having a rear surface attached to said front surface of said front right support, proving a secure attachment location of said feed and grain distributor for said front lift attachment of said tractor or skid steer.

9. The feed and grain distributor of claim 8, further comprising a battery mounted within a battery box on said base assembly providing electrical power to operate said piston actuator through a remote relay, also mounted upon said base assembly, compelling the opening and closing of said chute door panel visible from said tractor or skid steer.

10. Feed and grain distributor of claim 8, further comprising:

an upper end defining a load opening;
a front section defining a tapered lower panel;
a left section defining a tapered lower panel;
a right section defining a tapered lower panel;
a rear section defining a tapered lower panel, wherein said front section, left section, right section and rear sections and said corresponding tapered lower panels and are welded together, said welded tapered lower panels depending from said lower chute assembly.

* * * * *